May 19, 1970 — R. WITTENBECHER — 3,512,674
FRAME FOR JACKETING THE GLASS BULB OF PICTURE TUBES FOR IMPLOSION-PROTECTION
Filed June 28, 1967 — 3 Sheets-Sheet 1
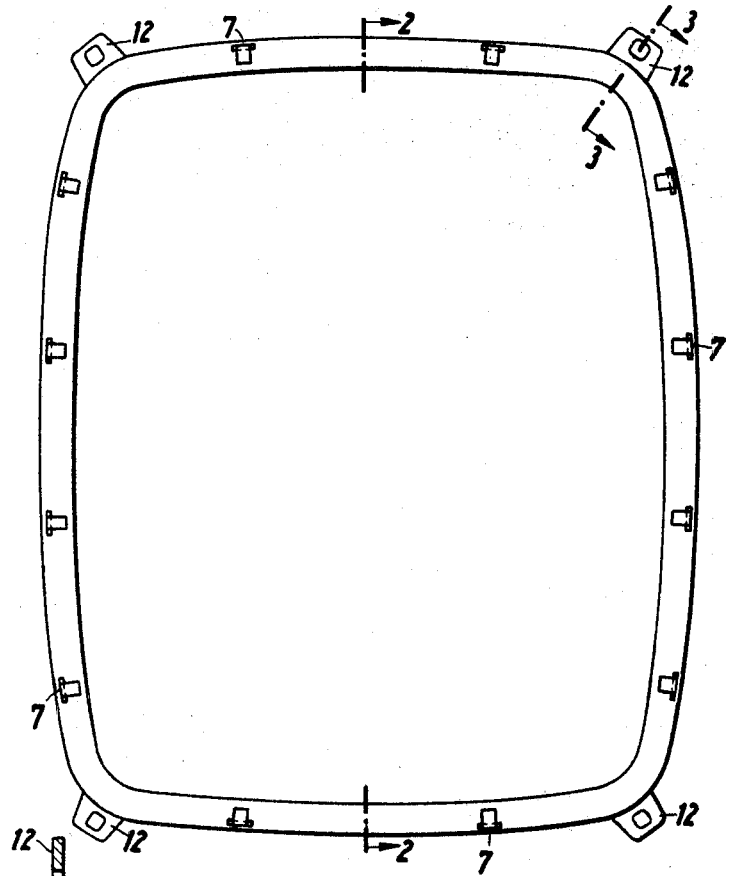
Fig. 1
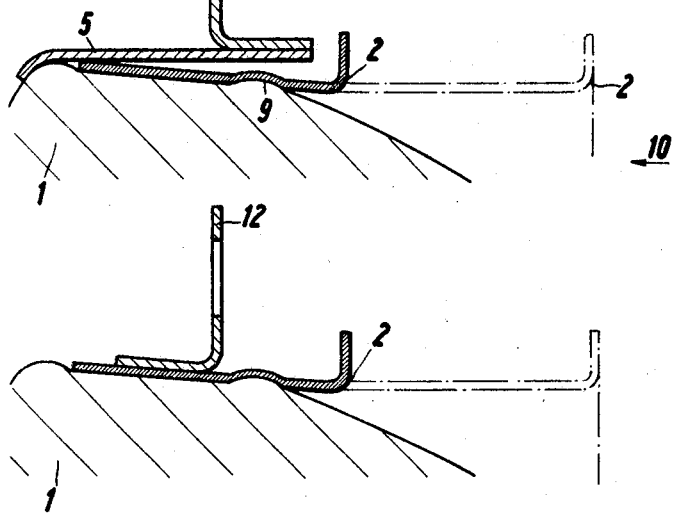
Fig. 3
Fig. 4
Inventor:
Rudolf Wittenbecher
by Allison C Collard

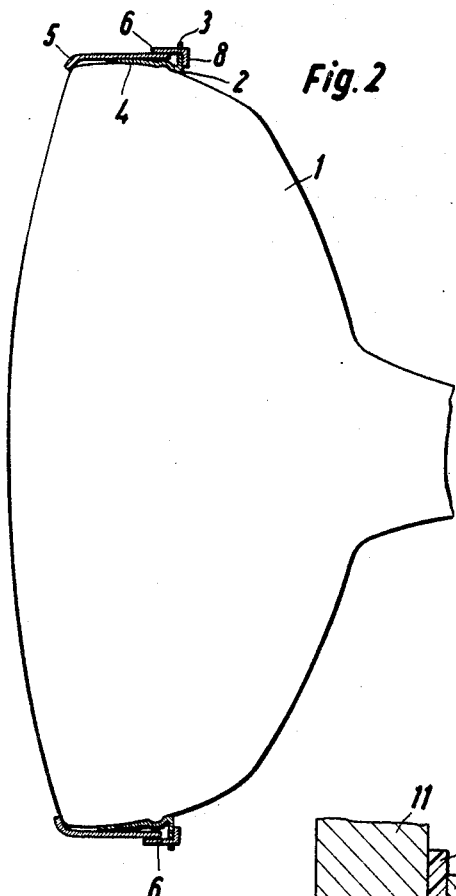
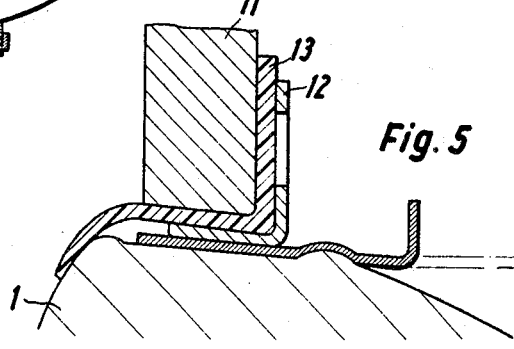
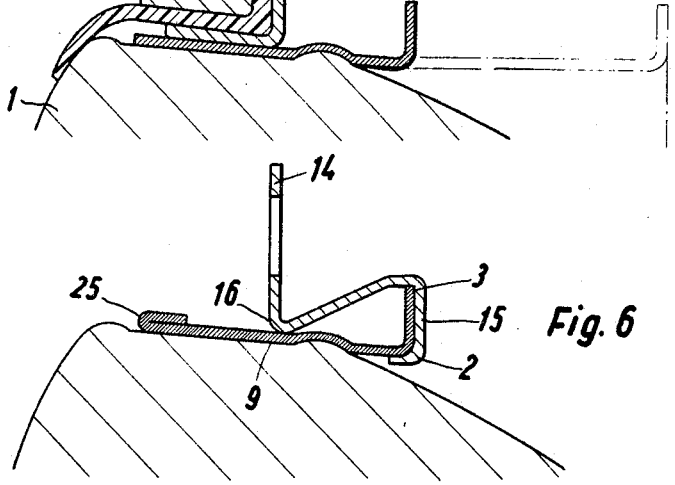

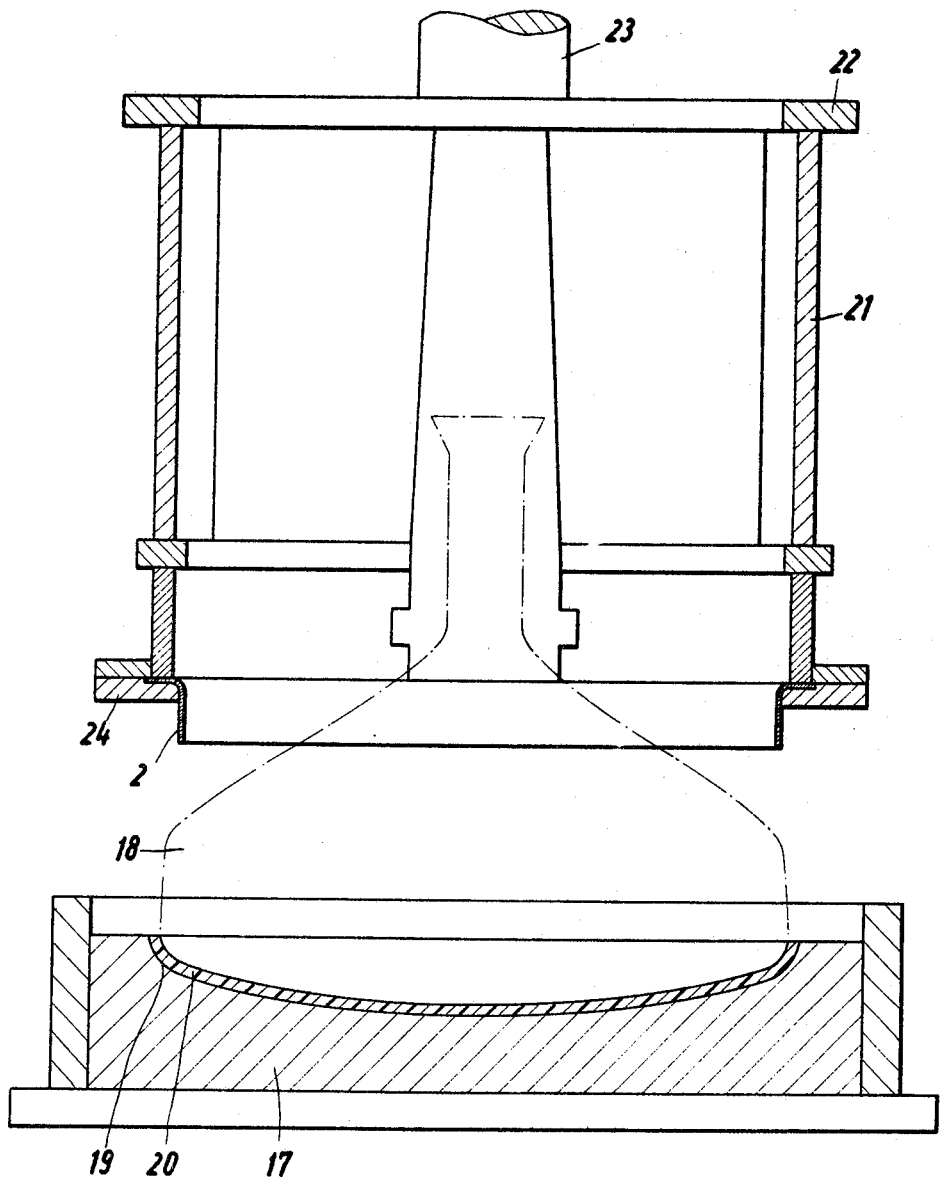

United States Patent Office 3,512,674
Patented May 19, 1970

3,512,674
FRAME FOR JACKETING THE GLASS BULB OF PICTURE TUBES FOR IMPLOSION-PROTECTION
Rudolf Wittenbecher, Berlin, Germany, assignor to Standard Elektrik Lorenz Aktiengesellschaft, Stuttgart Zuffenhausen, Germany, a corporation of Germany
Continuation-in-part of application Ser. No. 589,638, Oct. 26, 1966. This application June 28, 1967, Ser. No. 649,611
Claims priority, application Germany, June 30, 1966, W 41,899
Int. Cl. H01j 61/30
U.S. Cl. 220—2.1   6 Claims

ABSTRACT OF THE DISCLOSURE

A method and apparatus for encasing video picture tubes with a protective metal band on the conical portion of the tube by pressing the band onto the tube along its longitudinal axis in the direction of the picture screen. The band is of a unitary structure having a flat portion and an integral flange disposed along the end to engage fastening elements. The flat portion is adapted to press fit over the conical portion adjacent the screen and the flange is positioned at the end away from the screen.

---

This is a continuation in part of application Ser. No. 589,638, filed Oct. 26, 1966.

The present invention relates in general to a method and an apparatus for encasing tubes. More specifically, this invention relates to a method and apparatus for encasing video picture tubes with a frame to protect the tube from implosion.

In accordance with the invention, the novel frame serves first of all to protect the picture tube on the front face, facing the viewer against bursting into pieces by an implosion. Secondly, the frame serves as a mounting for containing the video tube by means of joints or bars extending from the frame to permit it to be secured to a television set. The invention further provides a simple and advantageous method and apparatus for carrying out the above-mentioned features as well as a simple method of mounting of the frame onto the front face of the picture tube.

The frame presently known in the art which protect the picture tube against implosion are generally made from frame-like bent strips of sheet metal. The cross-section of these frames is continuously arched in order to permit the frame to encompass the periphery of the tube so that the tube will be encased to the greatest possible extent.

The production costs, however, to manufacture this type of frame are considerably high and uneconomical. Furthermore, it is impossible to mount the frame onto the tube in such a manner that it completely encases the picture tube without leaving any amount of clearance. Therefore, it is common practice to leave a clearance of a few millimeters between the outer periphery of the tube and the inner circumference of the protective implosion frame after the frame is mounted on the picture tube. This clearance between the frame and the picture tube is usually filled with a casting compound, generally made of a plastic material such as carbamide, or the like. However, this method is time consuming, disadvantageous and expensive, because the filling of the clearance between the picture tube and the frame, with the aforementioned casting compound must be done by a machine or an apparatus. This method results usually in an impurification of the laquered outer face of the frame. This impurification must be cleared in a subsequent operating step. Because of this subsequent operation, it is necessary to cover the outer face of the frame with an expensive and high quality laquer, in order to prevent the lacquered face of the frame from being corroded by the overflow of casting compound.

Accordingly, a band frame is provided having an opening which corresponds to the diameter of a picture tube along the slight conical outer face of the tube, and which is pressed onto the tube along the longitudinal axis. The band frame is slid onto the tube under sufficient pressure so that the circumference of the band frame on the tube is achieved if the circumference of the band frame is enlarged by about 25 millimeters after being pressed onto the tube.

Thus, with the above-described method, a front support frame can be mounted and secured to the protective implosion band frame. It should be noted that this mounting and securing of the front support frame can be accomplished on the front face of the tube, whereby the smallest inner diameter of the front support frame will be slightly smaller than the screen of the tube. This portion of the front support frame, which in a known manner is bent slightly inward toward the screen of the tube, defines the outer limits of the video picture. The front support frame carries a plurality of extensions on its face which engage the protective implosion frame press-fitted over the video picture tube. Since the extensions of the front support frame, extending through the protective implosion frame, are bent around the rear face of the flange, the front frame is sufficiently secured to the press-fitted band frame.

The present invention consists substantially of a base plate having a receiving means which has a form corresponding to a video picture tube and a box-type video receiving device. The novel band frame is mounted to the lower portion of the box-type receiver by means of a tension ring. On the upper portion the band frame is connected to a cover plate by means of a centrally arranged mandrel.

In another embodiment of the invention, a plurality of angled pieces are distributed over the circumference of the novel band frame. These angular pieces are mounted on the outer and wider face of the band frame, and are provided with receiving slots for securing elements. Thes angular pieces are advantageously formed due to the fact that one end of these pieces can be bent into a U-shaped hook so that the hooks engage the flange portion of the band frame. Moreover, another projection of these angular pieces engage the portion of the protective implosion band frame which extends vertically with respect to the opening. A second shank of the projection is mounted vertically on the band frame face and provides an opening for the receiving of a securing element, such as a screw to secure the picture tube to the housing of the television set.

Therefore, an object of the present invention is to provide an improved method and apparatus for manufacturing and mounting a protective frame on a video picture tube to prevent implosion.

Another object of the present invention is to provide an improved method and apparatus for mounting a video picture tube within a television set.

It is another object of the present invention to provide an implosion proof frame secured to a video picture tube which also serves as a support for the picture tube within a television set.

It is also an object according to the present invention to provide an implosion-proof support for a video picture tube which overcomes all of the disadvantages of all known existing video tube support devices.

It is another object according to the present invention to provide an improved tooling method for rapidly inserting implosion-proof frames onto video picture tubes so that the frames are pre-stressed thereon.

It is still another object to provide an improved video tube support apparatus which is simple in design and construction, inexpensive to manufacture, attractive in appearance, and easy to assemble onto picture tubes.

These and other objects of the invention will become readily apparent from the following detailed description taken in consideration with the drawings wherein corresponding elements are provided with identical reference numerals throughout the several views:

FIG. 1 is a front plain view of a video picture with the novel protective implosion band frame secured thereon;

FIG. 2 is a cross-sectional view of FIG. 1 taken along section 2—2;

FIG. 3 is a cross-sectional view taken along section 3—3 of FIG. 1;

FIG. 4 is a cross-sectional view corresponding to FIG. 3 showing a further feature of the invention;

FIG. 5 is a cross-sectional view according to FIG. 4 showing a section of the housing, into which the picture tube is installed;

FIG. 6 is a cross-sectioned view in accordance with FIG. 4 showing a securing element slid over the band frame, and;

FIG. 7 is a longitudinal cross-sectional view of a tool for mounting the band frame according to the invention.

Referring to the figures, and in particular to FIGS. 1 and 2, a band frame 2 is shown having a unitary construction and mounted on the outer periphery of a video picture tube 1. Band frame 2 has an angular cross-section and integrally includes an upward projecting flange 3, and a wide foot portion 4 in contact with tube 1 and extending towards the opening face of tube 1. A front frame 5 is mounted onto picture tube 1 from the opposite side of the edge of portion 4. Band frame 2 is connected to front frame 5 by a plurality of spaced extensions 6 mounted onto one end of front frame 5. Extensions 6 engage a plurality of correspondingly spaced slots 7 disposed along flange 3 on band frame 2. Extensions 6 include an integral end portion 8 which extends through slots 7 of flange 3 and are bent inwardly toward tube 1. The leading edge of front frame 5 is bent toward the front face of picture tube 1 so as to firmly engage its glass face so that the picture screen is effectively masked by this leading edge. The above-described connections between front frame 5 and band frame 2 can be simply constructed and assembled and are to be considered a preferred embodiment of the invention. However, the connection of these two aforementioned construction parts may be carried out in a different manner without changing the basic construction of the novel protective implosion frame.

Another embodiment of the present invention may for example, include a band frame having a smooth angular profile which is pressed onto the slightly conical portion of picture tube 1. This frame assumes the exact form of the outer periphery of the picture tube during the pressing operation due to its forced elastic and slight plastic deformation. The glass portion of a picture tube is very rigid in the area of the picture screen and the adjacent areas. The thickness of the glass in these areas is about 8 millimeters and practical tests have shown that a sheet metal frome as described above and which has a thickness of about one (1) millimeter may be pressed and mounted onto the glass portion of the picture tube without any difficulties. In another part of this description it will be shown that this assembly can be performed without increasing the pressure tensions built up in the glass body.

The glass body of the picture tube is utilized as a pressure bearing surface for the novel band frame. With the assistance tube's pressure bearing surface the band frame assumes the desired shape since it is prestressed firmly to the circumference of the tube's glass body. The band frame thus provides the desired implosion protection against a bursting of the front portion of the video picture tube. However, for the desired implosion protection front frame 5 of FIGS. 1 and 2 does not play any decisive role in implosion protection of tube 1 but serves only as a mask for the screen on the tube.

Referring now to FIG. 3, band frame 2 is shown prior to insertion around tube 1 in broken lines. Band frame 2 has a cross-sectional opening corresponding to the cross-sectional area of the glass body of picture tube 1, along a plane ahead of ridge 9. By means of a device described later, band frame 2 is pressed onto picture tube 1 in the direction of arrow 10 until it reaches the position shown in dark line. The deforming pressures which are exerted on band frame 2 while it is pressed against picture tube 1 result in a press fit engagement of band frame 2 to picture tube 1.

Although band frame 2 may be slid onto picture tube 1 without any lubricating means, such as paste, it might be advantageous to cover the engaging surfaces of picture tube 1 and band frame 2 with a lubricating agent in order to reduce the already slight frictional resistance. Thus a bonding material may be coated onto the engaging surfaces of picture tube 1 and band frame 2 in order to insure an even greater safety factor against a displacement of band frame 2 on the surface of picture tube 1.

Referring to FIG. 5, picture tube 1 is shown secured to housing 11, by means of angle brackets 12. One of these angle brackets 12 is shown in a sectional view in FIG. 3. This bracket as well as all the others may be connected to front frame 5 in any suitable manner. Front frame 5 is secured to band frame 2 by means of extension 6 as discussed in detail above.

As shown in FIG. 4, front frame 5 may be completely removed so that angle bracket 12 is secured directly onto band frame 2. This securing may be carried out with a suitable plastic bonding material. Referring again to FIG. 5, a plastic screen 13 is placed between angle bracket 12 and housing 11 before angular piece 12 is joined to housing 11.

Referring to FIG. 6, particularly formed securing brackets 14 instead of the aforementioned brackets 12 are used as connecting joints between picture tube 1 and housing 11. Securing bracket 14 includes an integral U-shaped portion 15 frictionally engaged to flange 3 of frame 2, and rests with its apex portion 16 on wide foot portion 4 of band frame 2. This embodiment of securing bracket 14 has the advantage that it may be fastened without any auxiliary tools or securing elements onto band frame 2 by merely connecting portion 15 over flange 3. It is particularly advantageous when installing a picture tube, that the securing bracket 14 is not fixedly secured to flange 3, as shown in FIG. 6, so that they may be moved at random on flange 3 in order to provide alignment for screws to be inserted into predrilled holes within housing 11 (not shown) and through securing bracket 14.

In order that band frame 2 engage the outer surface of picture tube 1 more tightly, it has been found that by bending leading edge 15 over upon itself, that a pulling force is applied to this area of band frame 2 after insertion on tube 1. Moreover, by bordering edge 25, band frame 2 may be more easily mounted onto picture tube 1. The bordered edge also eliminates the possibility of the frame scratching the glass surface of tube 1 upon insertion. Subsequent to the jacketing of tube 1, the glass bulb becomes subject to such high pressure initial stresses that it can easily be subjected to mechanically and/or thermally caused local variations in tension (e.g. on account of impacts, heatings, etc.) without causing a breakage of the wall of the glass bulb.

In practice, a considerably number of the glass bulbs, while passing through the various stations of processing and stages of treatment before assembly to form the finished video tube, are broken due to heat tensions, impacts or shocks. The economical loss caused by the destruction of the tube becomes greater during the latter stages of manufacture of the tube due to the manufacturing costs (wages, material, overall costs) which have accumulated up to the time of the breakage.

Accordingly, the jacketing of the video tube with the band frame is no longer being performed at the end of the picture-tube manufacturing process subsequent to the insertion of its electrical elements, but at the beginning of its formation in the glass factory. The glass bulb formed by the glass-bulb manufacturer is jacketed to the so-called heating-out of the bulb to protect it from being destroyed during all of the following processing stations and stages of treatment, as well as during transportation.

Moreover, the inventive method can be easily carried out in the workshop of the glass bulb manufacturer with a single pressing-on process. The strap-type frame providing the implosion protection, under certain circumstances during the further treatment of the glass bulb, may be subjected to a corrosive environment to a greater extent than formally. For this reason it is of a particular advantage to manufacture the strap-type frame, in accordance with the invention, from a corrosion-resistant material, such as stainless steel.

FIG. 7 shows a further embodiment of a tool jig for carrying out the method as herein described. Accordingly, this tool jig consists substantially of a base plate 17, having a tube receiving portion 19 on one surface which corresponds to the shape of the screen of a picture tube 18 shown in broken line. In order to avoid scratching picture tube 1, receiving portion 19 may be padded with a soft material 20. After picture tube 18 has been introduced into base plate 17 as shown in FIG. 7, a box-type receiving tool is mounted over picutre tube 18. On the upper portion of receiving tool 21 is a cover plate 22 having a mandrel 23 secured thereto. On the lower portion of receiving tool 21 band frame 2 is secured by means of a tension ring 24. Receiving tool 21 is lowered from above over picture tube 18 until band frame 2 engages its conical portion. Picture tube 18 and band frame 2 are thus in alignment with respect to each other. Mandrel 23 is inserted into a press (not shown) so that pressure against mandrel 23 may be slowly increased to cause band frame 2 to be pressed slowly against picture tube 18. In this way, the above-described deforming operation takes place so that band frame 2 is firmly pressed against the outer periphery of the picture tube.

While only a few embodiments of the present invention have been shown and described, it is to be understood that additional modifications and changes may be made hereto without departing from the nature and scope of the invention as defined by the appended claims.

What I claim is:

1. A device for making video picture tubes implosion proof comprising a band frame of unitary integral construction, said frame having a flat cross-sectional foot portion defining the opening of said frame and an integral flange adapted to engage fastening elements, said opening being slightly smaller than the largest picture tube cross-section, the flat portion being adapted to press fit over the conical tube portion and the flange portion being disposed along the end of the flat portion and at an angle to the flat portion along the entire periphery of the band.

2. The device as recited in claim 1 wherein said flange includes slots for receiving fastening elements.

3. The device as recited in claim 1 wherein said frame additionally comprises securing brackets having one end standing perpendicular to said frame and having on its opposite end a U-shaped portion for frictionally engaging said flange, said brackets including an apex portion in its middle portion in contact with said foot portion.

4. The device as recited in claim 2 additionally comprising a support frame having a plurality of spaced apart extensions engaging to said slots and securing said band frame to said supporting frame.

5. The device as recited in claim 4 further comprising a plurality of angle brackets disposed around the circumference of said band frame, said brackets being secured to the foot portion of said band frame and having slots for receiving said support frame.

6. The device as recited in claim 1 wherein the leading edge of said foot portion is bent over upon itself so as to provide additional strength to said band frame.

References Cited
UNITED STATES PATENTS

| | | | |
|---|---|---|---|
| 2,785,820 | 3/1957 | Vincent et al. | |
| 2,938,690 | 5/1960 | Castle | 248—27 |
| 3,220,592 | 11/1965 | Powell et al. | |
| 3,248,480 | 4/1966 | Browning. | |
| 3,261,577 | 7/1966 | Gryse et al. | 248—27 |
| 3,278,682 | 10/1966 | Panis et al. | |
| 3,297,823 | 1/1967 | Neubauer | 178—7.82 |
| 3,317,172 | 5/1967 | Balint. | |

JOHN F. CAMPBELL, Primary Examiner

R. B. LAZARUS, Assistant Examiner

U.S. Cl. X.R.

248—27